United States Patent [19]

Mazzorana

[11] 4,266,642
[45] May 12, 1981

[54] FREE WHEELS

[75] Inventor: Alfred B. Mazzorana, Venissieux, France

[73] Assignee: Societe de Paris et du Rhone, Lyons, France

[21] Appl. No.: 23,197

[22] PCT Filed: Mar. 15, 1979

[86] PCT No.: PCT/FR78/00012

§ 371 Date: Mar. 15, 1979

§ 102(e) Date: Mar. 15, 1979

[87] PCT Pub. No.: WO79/00052

PCT Pub. Date: Feb. 8, 1979

[30] Foreign Application Priority Data

Jul. 20, 1977 [FR] France .................. 77 22836

[51] Int. Cl.³ .................................. F16D 15/00
[52] U.S. Cl. .................................. 192/45
[58] Field of Search .............. 192/45; 188/82, 84; 100/297

[56] References Cited

U.S. PATENT DOCUMENTS

| | | | |
|---|---|---|---|
| 697,206 | 4/1902 | Henderson | 192/45 |
| 3,403,762 | 10/1968 | Auriol | 192/45 |
| 3,732,957 | 5/1973 | McEwen | 192/45 |

FOREIGN PATENT DOCUMENTS 251403 10/1912 Fed. Rep. of Germany .
741602 2/1933 France .
1456088 9/1966 France .

*Primary Examiner*—Philip C. Kannan
*Attorney, Agent, or Firm*—Dowell & Dowell

[57] ABSTRACT

Unidirectional drive device comprising a cage inside which a shaft rotates so that, in a certain direction it drives this cage, of the type comprising grooves of which the section on one of its faces is smaller than the one which they determine on the other face, the grooves made in the bore of the cage being defined as each being obtained by penetration in the wall of this bore of a cylinder inclined with respect to the geometrical axis of this bore and which is displaced parallel to a longitudinal diametrical plane of this latter, while balls, known per se, are introduced in the passage determined between each groove and the shaft with a view to constituting members for wedging between the cage and the shaft.

2 Claims, 4 Drawing Figures

FREE WHEELS

The present invention relates to improvements in free wheels i.e. unidirectional drive mechanisms comprising a cage inside which a shaft rotates so that, in a certain direction, it drives this cage. A number of free wheel devices exist, but they generally present drawbacks which are very often due to the considerable number of parts which they comprise. This complexity also increases the cost price.

The improvements forming the subject matter of the present invention envisage remedying these drawbacks and enabling a free wheel to be produced which is of extremely simple construction and which ensures a perfect drive of one member by the other.

According to the invention, the bore of the cage of the free wheel is provided with grooves which are defined as each being obtained by penetration in the wall of this bore of a cylinder inclined with respect to the geometrical axis of said bore and which is displaced at right angles to a longitudinal diametrical plane of this latter so that the section of the groove on one of the faces of the cage is smaller than the one which it produces on the other face, whilst balls are introduced into each groove from its largest section with a view to constituting members for wedging between the cage and the shaft.

The invention will be more readily understood on reading the following description with reference to the accompanying drawings, in which.

Figure 4:
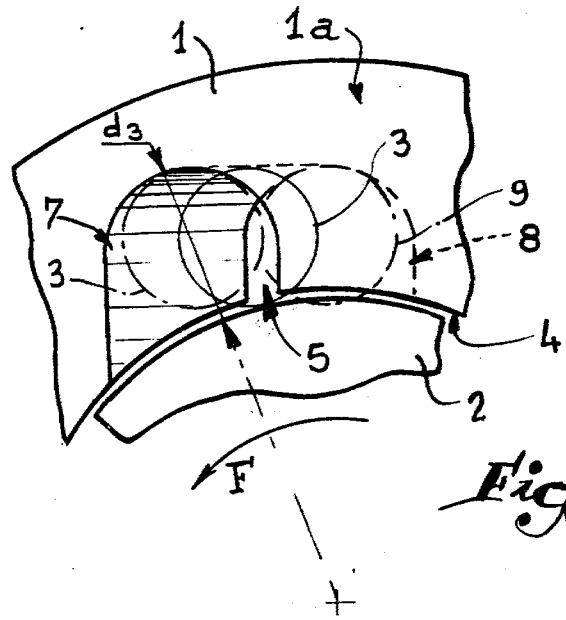

FIG. 4 schematically illustrates the manner in which the two members of the free wheel according to the invention are rendered fast.

Figure 1:
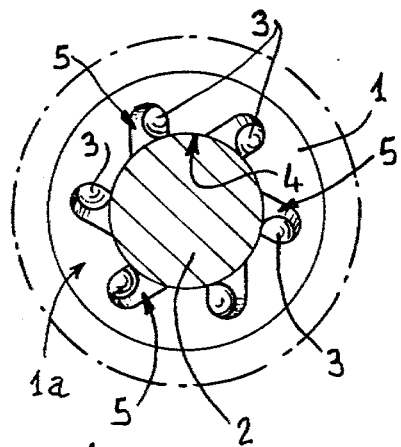
FIG. 1 is a schematic plan view of a free wheel made according to the invention.

Referring now to the drawings, FIG. 1 shows a cylindrical member constituting the cage 1 of a free wheel according to the invention and which comprises a shaft 2 and elements connecting these two members in the form of spherical balls 3.

Figure 2:
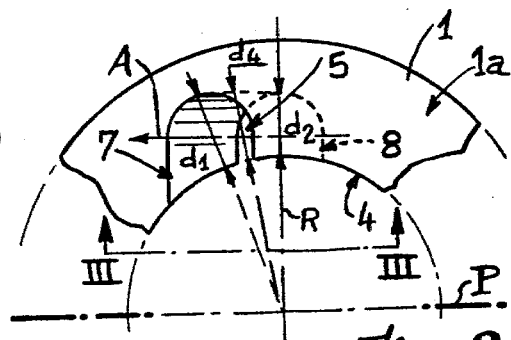
FIG. 2 is a partial view, on a larger scale, of the cage of the free wheel according to the invention.
Figure 3:
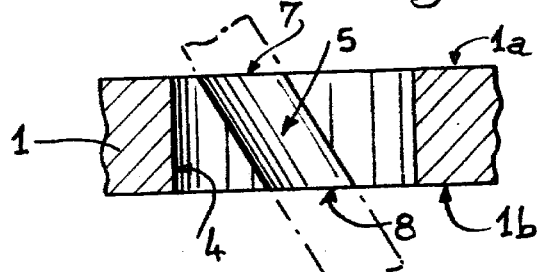
FIG. 3 is a section along III—III of FIG. 2.

The cage 1 comprises a central bore 4 of which the diameter, apart from the clearance, is equal to the outer diameter of the shaft 2. The latter may therefore rotate freely in the bore 4. As shown in FIG. 2, the cage 1 comprises grooves 5 distributed uniformly about this bore and which are, in any case, three in number of a multiple of this number. In the example shown, six grooves 5 have been provided. Their number is of course a function of the torque to be transmitted.

The grooves 5 may be defined as being made by means of a cylindrical milling cutter 6 which mills a semicylindrical wall portion whose gemoetrical axis A is skewed with respect to the axis of the shaft and of the bore 4 and which geometric axis is offset along a radial R at right angles from a longitudinal plane P including the shaft axis and parallel to the geometric axis, FIG. 2. Such a penetration of the milling cutter 6 therefore determines on the near face 1a of the cage a cross-sectional depth of the groove greater than the groove depth at 8 on the far face 1b of the cage 1. It is easily understood that the radial distance d1 separating the bottom of the deeper section 7 from the periphery of the bore 4 is greater than the corresponding distance, d2, of the shallower section 8 of the groove.

Under these conditions, when the shaft 2 is disposed in the bore 4 of the cage 1 (FIG. 4), it is possible to introduce a ball 3 in the passage determined by each groove and said shaft on condition that the diameter of said ball is smaller than the distance d3 separating the bottom of the section 7 and the periphery of the shaft 2, taking this distance along a radius common to the cage and to the shaft. This distance is therefore equal to the d1, to which is added the clearance between the shaft 2 and the bore 4. However, as this is negligible with respect to distance d1, it may be said that the diameter of each ball 3 must be smaller than the distance d1 in order to be able to enter in the said passage. The depth of the grooves 5, i.e. the distances d1 and d2 is advantageously chosen so that the average distance d4 of each of these grooves is approximately equal to the diameter of the balls 3. Thus, when they are introduced in the abovementioned passages, they abut on the one hand against the periphery of the shaft 2, and on the other hand against the bottom of the groove 5 about half-way up the cage. Means are provided (not shown) for maintaining each ball elastically in this position. For example, a compression spring may be used, of which one of the ends abuts against the ball in question, whilst its other end is maintained by a stop (not shown) fast with the upper face 1a of the cage 1.

If the shaft 2 rotates in the direction of arrow F of FIG. 4, its periphery tends to cause the balls to be displaced upwardly against the reaction of the spring, so that said shaft may rotate freely in the bore 4. On the contrary, if the shaft 2 rotates in the other direction, it tends to cause the balls to descend in each of the grooves 5, i.e. to take them to an imaginary position 9 in which they would project in the bore 4. This displacement being impossible due to the presence of the shaft 2, it is simply translated by a wedging of the balls between the bottom of the grooves and the periphery of the shaft 2. This latter therefore becomes fast with the cage 1 which it drives in rotation.

I claim:

1. An improved unidirectional drive device of the type including a shaft having an axis, a cage having a central bore receiving the shaft with close clearance, and multiple balls riding on the surface of the shaft and operative to wedge and couple the shaft and cage in one direction of relative rotation and to free the coupling in the other direction, the improvement wherein the cage includes for each ball a groove extending substantially lengthwise through the cage and having a semicylindrical wall portion opening into the central bore along straight wall portions, the semicyindrical wall portion having a geometric axis intersecting at one end of the cage a radial drawn through the shaft axis at a point spaced by less than the radius of a ball from the shaft surface, and the geometric axis of the semicylindrical wall portion lying parallel to a plane which includes the axis of the shaft and is disposed normal to said radial; and the geometric axes of all of the grooves being skewed in the same direction out of parallel relationship with the shaft and disposed so that each geometric axis is closer to the shaft surface at said one end than at the other end of the cage.

2. A device as claimed in claim 1, wherein the depth of each groove as measured from the bore is less than the diameter of a ball at said one end and greater than the diameter of a ball at said other end.

* * * * *

UNITED STATES PATENT AND TRADEMARK OFFICE
CERTIFICATE OF CORRECTION

PATENT NO. : 4,266,642
DATED : May 12, 1981
INVENTOR(S) : Alfred Bruno Mazzorana It is certified that error appears in the above—identified patent and that said Letters Patent is hereby corrected as shown below:

On The Title Page the illustrative figure should appear as shown below.

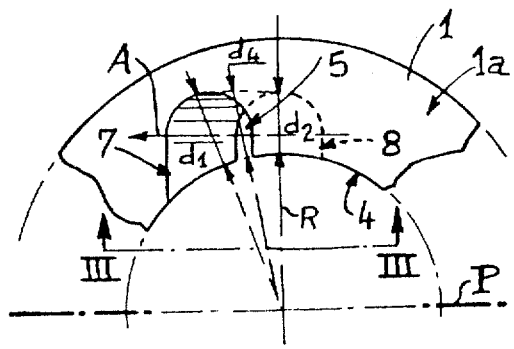

Signed and Sealed this

Thirteenth Day of October 1981

[SEAL]

Attest:

GERALD J. MOSSINGHOFF

Attesting Officer — Commissioner of Patents and Trademarks